United States Patent

Yoon

(10) Patent No.: US 9,078,087 B2
(45) Date of Patent: Jul. 7, 2015

(54) METHOD AND APPARATUS FOR FORMING WI-FI P2P GROUP USING WI-FI DIRECT

(75) Inventor: Su-Ha Yoon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 229 days.

(21) Appl. No.: 13/567,346

(22) Filed: Aug. 6, 2012

(65) Prior Publication Data

US 2013/0040576 A1    Feb. 14, 2013

(30) Foreign Application Priority Data

Aug. 8, 2011  (KR) .......................... 10-2011-0078641

(51) Int. Cl.
*H04B 7/00* (2006.01)
*H04W 8/00* (2009.01)
*H04W 76/02* (2009.01)

(52) U.S. Cl.
CPC ............ *H04W 8/005* (2013.01); *H04W 76/023* (2013.01)

(58) Field of Classification Search
USPC ............... 455/41.2, 41.3, 500, 517, 518, 519; 709/206, 227; 370/338
See application file for complete search history.

(56) References Cited

U.S. PATENT DOCUMENTS

| | | |
|---|---|---|
| 2010/0235460 A1 | 9/2010 | Mochizuki et al. |
| 2011/0034127 A1* | 2/2011 | Wentink et al. .............. 455/41.2 |
| 2011/0082905 A1* | 4/2011 | Wentink et al. ................ 709/205 |
| 2011/0225305 A1* | 9/2011 | Vedantham et al. .......... 709/227 |
| 2012/0106375 A1* | 5/2012 | Woo .............................. 370/252 |
| 2012/0173620 A1* | 7/2012 | Holostov et al. .............. 709/204 |
| 2012/0233266 A1* | 9/2012 | Hassan et al. ................. 709/206 |

FOREIGN PATENT DOCUMENTS

KR    10-2010-0102916 A    9/2010

* cited by examiner

*Primary Examiner* — Nguyen Vo

(74) *Attorney, Agent, or Firm* — Cha & Reiter, LLC

(57) ABSTRACT

Provided is a method for forming a Wi-Fi Peer-to-Peer (P2P) group using Wi-Fi Direct. The method includes acquiring device information of other P2P device corresponding to a connection target by P2P devices that will form a Wi-Fi P2P group; checking a type of the other P2P devices based on the acquired device information; adjusting an intent value of a P2P device depending on the checked type of the other P2P devices; and forming a Wi-Fi P2P group based on the adjusted intent values of the P2P devices.

26 Claims, 5 Drawing Sheets

METHOD AND APPARATUS FOR FORMING WI-FI P2P GROUP USING WI-FI DIRECT

CLAIM OF PRIORITY

This application claims, under 35 U.S.C. §119(a), priority to and the benefit of the earlier filing date of, that patent application filed in the Korean Intellectual Property Office on Aug. 8, 2011 and assigned Serial No. 10-2011-0078641, the entire disclosure of which is hereby incorporated by reference.

BACKGROUND OF THE INVENTION

1. Field of the Invention

The present invention relates generally to wireless communications, and more particularly, to a method and apparatus for forming a Wi-Fi P2P group using Wi-Fi Direct.

2. Description of the Related Art

Mobile terminals, which have evolved into smart phones, provide a variety of useful features to users through applications, are downloaded over wireless networks that expand the operational functionality of the basic mobile terminal. Among various features provided by mobile terminals, is a technology, referred to as Wi-Fi Direct that has been proposed by the Wi-Fi Alliance.

Wi-Fi Direct, a new communication method proposed by the Wi-Fi Alliance provides a feature in which devices supporting Wi-Fi Direct may share information by communicating with each other without hotspots, routers and/or Access Points (APs). Common electronic devices having undergone certification of Wi-Fi Direct, such as mobile terminals, printers, monitors, TVs, and game consoles, may perform wireless communication with each other using the Wi-Fi Direct technology.

Although Wi-Fi Direct is partially similar to Bluetooth in terms of inter-device wireless communication capability, Wi-Fi Direct is advantageous over Bluetooth in terms of the coverage and data rate. So, the Wi-Fi Direct feature may replace Bluetooth as the standard inter-device wireless communication technology. For example, while Bluetooth 4.0, the latest Bluetooth standard, supports coverage of a maximum of 100 m and a data rate of a maximum of 24 Mbps, Wi-Fi Direct supports coverage of a maximum of 200 m and a data rate of a maximum of 300 Mbps. Therefore, Wi-Fi Direct has the advantage over Bluetooth in many aspects.

Wi-Fi Direct, also called Wi-Fi P2P, supports a feature of forming a Wi-Fi P2P network by forming a Peer-to-Peer group (P2P group) among devices. The P2P group is then referred to as a Wi-Fi P2P group and includes a Group Owner (GO) and Group Clients (GCs).

A Group Owner, playing a role similar to the conventional wireless router, plays a central role in the Wi-Fi P2P group, and allows connection of other devices (e.g., GCs) or adjusts start and end of the P2P group.

A Group Owner may be seen as an AP from the viewpoint of Group Clients. Group Clients, which are the remaining devices, except for GO in the P2P group, operate as clients by being connected to the P2P group, and are provided with a communication feature with the Group Owner and other Group Clients in the P2P group.

In Wi-Fi Direct, intent values of respective devices are compared in order to form a Wi-Fi P2P group.

A device with the highest intent value becomes the Group Owner, and the other devices become Group Clients. Compared to Group Clients, the Group Owner consumes more power because it controls the overall operation of the Wi-Fi P2P group. Therefore, if a mobile terminal powered by a battery (hereinafter referred to as a "battery-powered mobile terminal") operates as Group Owner in the Wi-Fi P2P group, it is highly likely to reduce a running time (or driving time) of the mobile terminal due to the rapid battery consumption.

However, when forming a Wi-Fi P2P group, the current Wi-Fi Direct determines Group Owner by simply comparing intent values without any other criteria, so the battery-powered mobile terminal is likely to be determined as Group Owner. For example, assuming that a battery-powered mobile terminal and TV powered by a constant power source, such as wall power (e.g., always-powered TV), form a Wi-Fi P2P group, the mobile terminal may be determined as a Group Owner, even though it would be desirable to have the TV be the Group Owner when the battery replacement issue is considered.

Therefore, there is a need for a method and apparatus capable of complementing the current Wi-Fi Direct feature of selecting Group Owners by considering additional criteria for determining a Group Owner in a P2P network.

SUMMARY OF THE INVENTION

An aspect of exemplary embodiments of the present invention is to provide a method and apparatus capable of forming a Wi-Fi P2P group so as to secure a maximum possible running time of a mobile terminal.

In accordance with one aspect of the present invention, there is provided a method for forming a Wi-Fi Peer-to-Peer (P2P) group using Wi-Fi Direct. The method includes acquiring device information of P2P devices that will form a Wi-Fi P2P group; checking a type of each of the P2P devices based on the acquired device information; adjusting intent values of each of the P2P devices based on the checked type of other P2P devices; and forming a Wi-Fi P2P group based on the adjusted intent values of the P2P devices.

In accordance with another aspect of the present invention, there is provided a method for forming a Wi-Fi Peer-to-Peer (P2P) group using Wi-Fi Direct. The method includes acquiring device information of P2P devices that will form a Wi-Fi P2P group; checking a possible running time of the P2P devices based on the acquired device information; adjusting intent values of the P2P devices depending on the checked possible running time of the P2P devices; and forming a Wi-Fi P2P group based on the adjusted intent values of the P2P devices.

In accordance with further another aspect of the present invention, there is provided an apparatus for forming a Wi-Fi Peer-to-Peer (P2P) group using Wi-Fi Direct. The apparatus includes a Wi-Fi module for providing a short-range wireless communication function based on an IEEE 802.11 standard; and a controller for acquiring device information of another P2P device corresponding to a connection target to form a Wi-Fi P2P group by means of the Wi-Fi module, checking a type of other P2P device based on the acquired device information, adjusting an intent value of a P2P device associated with the apparatus based on the checked type of the other P2P device, and forming a Wi-Fi P2P group with the other P2P devices based on the adjusted intent value.

In accordance with yet another aspect of the present invention, there is provided an apparatus for forming a Wi-Fi Peer-to-Peer (P2P) group using Wi-Fi Direct. The apparatus includes a Wi-Fi module for providing a short-range wireless communication function based on an IEEE 802.11 standard; and a controller for acquiring device information of another P2P device corresponding to a connection target to form a Wi-Fi P2P group by means of the Wi-Fi module, checking a possible running time of the other P2P device based on the acquired device information, adjusting an intent value of a P2P device associated with the apparatus depending on the checked possible running time of the other P2P device, and forming a Wi-Fi P2P group with the other P2P device based on the adjusted intent value.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF THE INVENTION

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

Among the terms set forth herein, a mobile or portable terminal or terminal refers to any kind of device capable of processing data that is transmitted or received to or from any external entity. The terminal may display icons or menus on a screen to which stored data and various executable functions are assigned or mapped. The terminal may represent a computer, a notebook, a tablet PC, a mobile device, and the like.

Figure 1A:
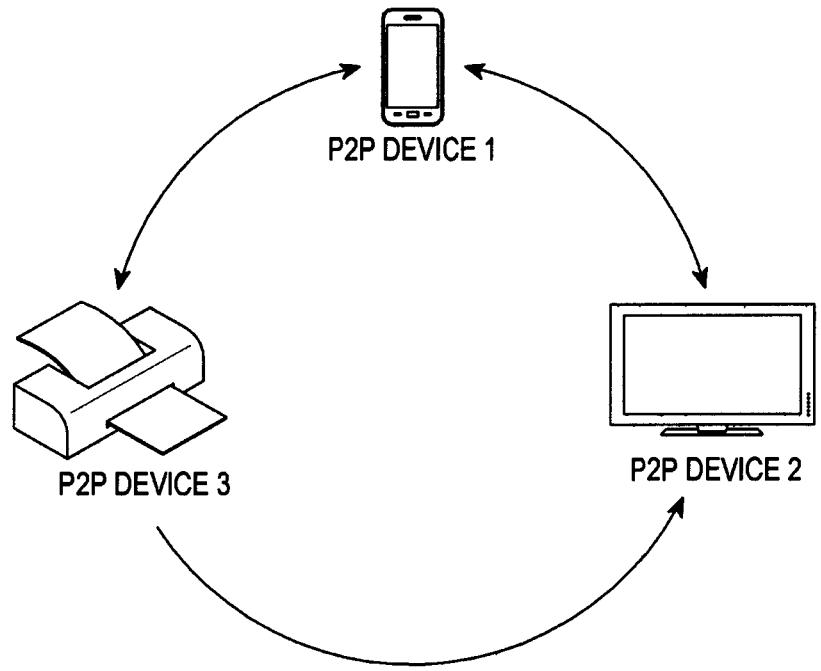
FIG. 1A illustrates a Wi-Fi P2P group formed based on a Wi-Fi Direct technology.

FIG. 1A illustrates an exemplary Wi-Fi P2P group formed based on Wi-Fi Direct technology.

Referring to FIG. 1A, P2P device 1 represents a mobile terminal, P2P device 2 represents a TV, and a P2P device 3 represents a printer. Devices that may be included in a Wi-Fi P2P group are those devices including a communication module complying with at least the IEEE 802.11g standard (e.g., 802.11g and/or 802.11n) for Wireless Local Area Network (WLAN), and satisfy certification criteria specified by the Wi-Fi Alliance.

In an embodiment of the present invention, devices capable of constituting a Wi-Fi P2P group may be divided into devices powered by a battery (hereinafter referred to as 'battery-powered devices') and devices powered by plug power or outlet power (hereinafter referred to as 'always-powered devices').

Figure 1B:
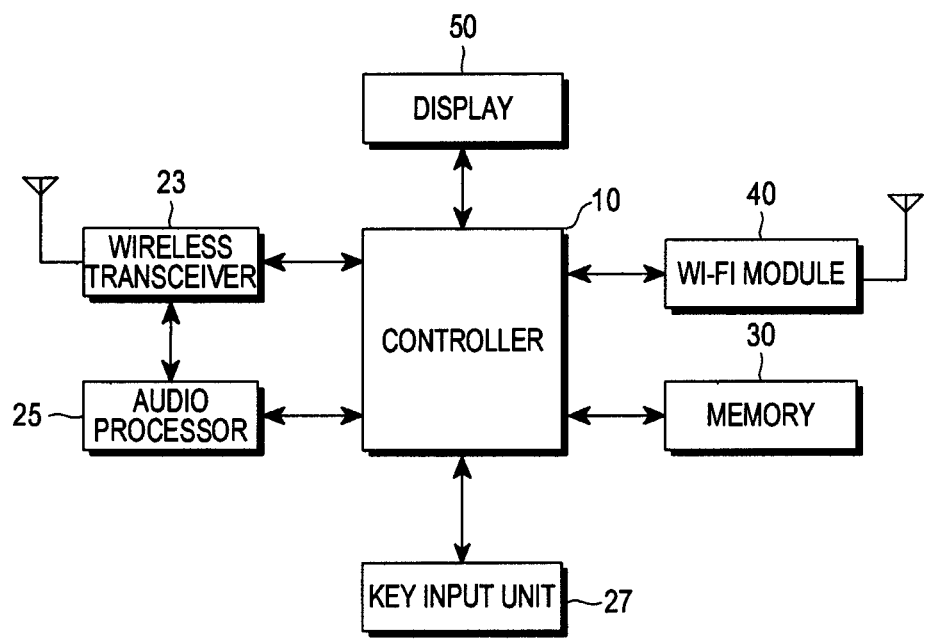
FIG. 1B is a block diagram of a mobile terminal according to an embodiment of the present invention.

FIG. 1B is a block diagram of a mobile terminal according to an embodiment of the present invention, in which the mobile terminal is considered a battery-powered device.

A mobile terminal, to which an embodiment of the present invention is applicable, may include mobile electronic devices that a user may easily carry with him or her. For example, a mobile terminals may be video phones, cell phones, smart phones, International Mobile Telecommunication 2000 (IMT-2000) terminals, Wideband Code Division Multiple Access (WCDMA) terminals, Universal Mobile Telecommunication Service (UMTS) terminals, Personal Digital Assistants (PDAs), Portable Multimedia Players (PMPs), Digital Multimedia Broadcasting (DMB) terminals, E-Books, portable computers (e.g., notebook computers, tablet computers, etc.), digital cameras, and portable gaming devices. A mobile terminal according to an embodiment of the present invention will be described below with reference to FIG. 1B.

FIG. 1B illustrates an exemplary configuration of a mobile terminal in accordance with the principles of the invention.

In this illustrated example, a wireless transceiver 23 includes a Radio Frequency (RF) unit (not shown) and a modulator/demodulator (modem) (not shown). The RF unit includes an RF transmitter for up-converting a frequency of transmission signals and amplifying the up-converted transmission signals, and an RF receiver for low-noise-amplifying received signals and down-converting a frequency of the amplified signals. The modem includes a transmitter for coding and modulating transmission signals, and a receiver for demodulating and decoding signals received from the RF unit.

An audio processor 25 may include a coder/decoder (codec) (not shown). In addition, the codec may include both a data codec and an audio codec. The data codec processes data signals such as packet data, and the audio codec processes audio signals such as voice and multimedia files. The audio processor 25 converts digital audio signals received from the modem into analog audio signals by means of the audio codec, and plays the analog audio signals using a speaker (not shown). The audio processor 25 converts analog audio signals picked up by a microphone (not shown) into digital audio signals by means of the audio codec, and transfers the digital audio signals to the modem. In an alternative aspect, the codec may be included in a controller 10. In this case signals received by the audio processor 25 are transferred to the controller for processing.

A key input unit 27 may include alphanumeric keys needed to input numeric and text information and function keys needed to set various functions, or may include a touch pad. When a display 50 has a capacitive or resistive touch screen, the key input unit 27 may include a minimum number of predetermined keys, and the display 50 may partially replace the key input function of the key input unit 27.

A memory 30 may include a program memory (not shown) and a data memory (not shown). The program memory stores programs for controlling the overall operation of the mobile terminal. The data memory may store information collected during the operation of the mobile terminal. The memory 30 may further represent external memories such as Compact Flash (CF), Secure Digital (SD), Micro Secure Digital (Micro-SD), Mini Secure Digital (Mini-SD), Extreme Digital (xD), and memory stick. The memory 30 may also include disks such as Hard Disk Drive (HDD) and Solid State Disk (SSD).

A Wi-Fi module 40 provides a short-range wireless communication function based on the IEEE 802.11 standard. Using the Wi-Fi module 40, a user of the mobile terminal may form (or create) a Wi-Fi P2P group and enjoy a data exchange feature among Wi-Fi direct compliant devices.

The display 50 may include a Liquid Crystal Display (LCD) or an Organic Light Emitting Diode (OLED), which is classified into Passive Matrix OLED (PMOLED) and Active Matrix OLED (AMOLED), respectively, and output various display information generated by the mobile terminal When the display 50 includes a capacitive or resistive touch screen, the display 50 may operate as an input unit for controlling the mobile terminal. This touch screen capability may operate with the key input unit 27 or replace the key input unit 27. Touch screen technology is well-known in the art and need not be discussed in detail herein.

The controller 10 controls the overall operation of the mobile terminal, and may switch and control an operation of the mobile terminal depending on user inputs received through the key input unit 27 or the display 50. In accordance with an embodiment of the present invention, the controller 10 may check a possible running time of the mobile terminal by checking the remaining amount of a battery (not shown). Battery level monitoring is a well-known method for determining a remaining life in a battery. Battery level monitoring is well-known in the art and need not be discussed in detail herein.

The controller 10 acquires device information of other P2P devices corresponding to a connection target to form a Wi-Fi P2P group by means of the Wi-Fi module 40, checks a type of the other P2P devices based on the acquired device information, adjusts an intent value of the P2P device in which the controller is incorporated depending on the checked type of the other devices, and forms a Wi-Fi P2P group with the other devices based on the adjusted intent value.

Also, the controller 10 acquires device information of the other devices corresponding to a connection target to form a Wi-Fi P2P group by means of the Wi-Fi module 40, checks a possible running time of the other devices based on the acquired device information, adjusts an intent value of the P2P device in which the controller is incorporated depending on the possible running time of the other devices, and forms a Wi-Fi P2P group with the other devices based on the adjusted intent value.

As previously described, an always-powered device refers to a device such as TV, printer, monitor, refrigerator, washer, and game console (e.g., Xbox) capable of forming a Wi-Fi P2P group with a mobile terminal through wireless communication. For example, if a mobile terminal is a camera and has formed a Wi-Fi P2P group with a printer, the mobile terminal may transmit captured images directly to the printer to have the printer print out the transferred pictures.

Figure 2:
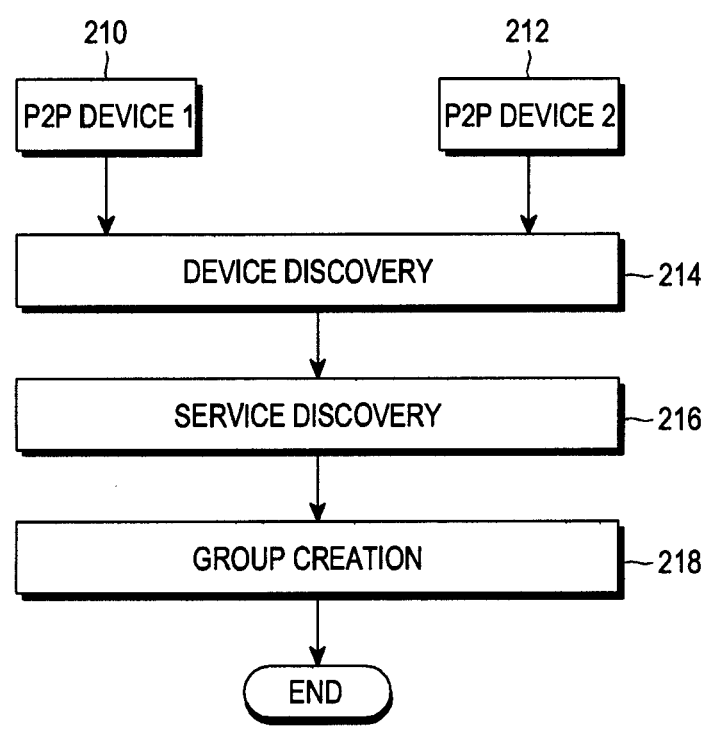
FIG. 2 schematically illustrates a process of forming a Wi-Fi P2P group by devices having undergone Wi-Fi Direct certification.

FIG. 2 schematically illustrates a process of forming a Wi-Fi P2P group by devices having undergone Wi-Fi Direct certification. Prior to a description of an embodiment of the present invention for adjusting intent values depending on types of devices constituting a Wi-Fi P2P group, a process of forming a Wi-Fi P2P group will be described below with reference to FIG. 2.

A process of forming a Wi-Fi P2P group may be achieved in three steps: device discovery 214, service discovery 216, and group creation 218.

Device Discovery

Connecting devices supporting Wi-Fi based on the Wi-Fi Direct feature is called creating (or forming) a Wi-Fi P2P group, and a device discovery process 214 is a procedure needed to allow Wi-Fi devices (e.g., P2P device 1, 210 and P2P device 2, 212) to recognize and connect with each other, in order to form a Wi-Fi P2P group.

A Wi-Fi P2P device (e.g., P2P device 1, 210), which has entered a menu in which it desires to use the Wi-Fi Direct feature or has entered a device discovery mode at a running request for an application, discovers surrounding Wi-Fi P2P devices by repeating the functions of channel Scan, Listen and Search specified by an IEEE 802.11 standard at intervals of a predetermined time. The basic operation of the device search procedure performed in the process of forming a Wi-Fi P2P group is performed by exchanging Probe Request and Probe Response messages of an IEEE 802.11 MAC protocol. Probe Request includes information such as P2P IE, WSC IE and Supp Reg IE, and Probe Response includes P2P IE, WSC IE, RSN IE and Supp Reg IE. An embodiment of the present invention for adjusting intent values depending on types of devices constituting a Wi-Fi P2P group may be realized based on WSC-IE information, and a field of WSC-IE includes information such as DEVICE PASSWORD ID, MANUFACTURER, MODEL NAME, MODEL NUMBER, SERIAL NUMBER, and DEVICE NAME. An embodiment of the present invention based thereon will be described later on with reference to FIGS. 3 and 5.

Service Discovery

Service discovery 216 may be optionally performed in the above-described device discovery process and a group creation process 218 described below. The service discovery process is performed to provide a feature in which each P2P device checks its supportable service protocol and services and exchanges information about the services it can provide.

Assuming that a P2P device 1, 210 is a camera and a P2P device 2, 212 is a printer, if a user of the P2P device 1, 210 wants to output a photo, the P2P device 1, 210 may determine whether a photo output feature of the P2P device 2, 212 is available through the service search, because the P2P device 1, 210 needs to determine whether the P2P device 2, 212 supports the photo output feature.

Assuming that file sharing between the P2P device 1, 210 and the P2P device 2, 212 is requested through forming of a Wi-Fi P2P group, file sharing between the two devices may not be achieved if the P2P device 1, 210 uses file sharing based on Universal Plug and Play (UPNP) but the P2P device 2, 212 uses file sharing based on Web Service (WS). Therefore, the service discovery process is not essential to create a Wi-Fi P2P group, but corresponds to a necessary process.

Group Creation

A Wi-Fi P2P group requires a group creation process 218 for creating a group, further includes determining a device that will play a central role (or Group Owner) in the Wi-Fi P2P group.

In Wi-Fi Direct, P2P devices (e.g., P2P device 1, 210 and P2P device 2, 212) perform Provision Discovery to form or create a Wi-Fi P2P group, and the Provision Discovery is one of the important features defined in the specification of Wi-Fi Direct.

P2P devices in Wi-Fi Direct basically operate based on Wi-Fi Simple Configuration (WSC), i.e., operate based on Wi-Fi Protected Setup (WPS). While WSC support of a connection device was optional in the existing Wi-Fi standard, WSC support is mandatory in Wi-Fi Direct. WSC, a feature provided for more convenient wireless connections, may be classified as a Push Button Configuration (PBC) scheme in which a button should be pushed and a PIN scheme in which a pin number should be input. For both the PBC scheme and the PIN scheme, their setting should be completed within 120 seconds (which is inconveniently short). For example, in the PBC scheme, a WSC Registration Protocol starts and a Service Set Identify (SSID) and credential necessary for connection are exchanged, only when a WPS button is input on another device within 120 seconds after one device requested wireless connection based on the PBC scheme.

The newly defined standard in Wi-Fi Direct to relieve these inconveniences of the conventional WSC is a Provision Discovery scheme, in which when a first Wi-Fi P2P device (e.g., P2P device 1, 210) attempts connection based on the conventional WSC (PBC scheme or PIN scheme) after discovering another Wi-Fi P2P device (e.g., P2P device 2, 212), the first Wi-Fi P2P device informs the other device's user of the connection attempt by sending a WSC Configuration Method message.

The WSC Configuration Method message includes types: PBC, PIN from Display, and PIN from Keypad. PBC allows the other device's user to receive a button, and a PIN from Display and a PIN from Keypad may inform the other device's user of the Wi-Fi P2P connection attempt by displaying a pin number on the other device or by an event where a pin number is received.

When the Provision Discovery is completed the users of the P2P device 1, 210 and the P2P device 2, 212 accept the Wi-Fi P2P connection, and then a Group Owner Negotiation process is performed between the Wi-Fi P2P devices.

The Group Owner Negotiation process is performed by an exchange of a GO Negotiation Request, a GO Negotiation Response and GO Negotiation Confirm frames, wherein the GO Negotiation Request and GO Negotiation Response include P2P IE information and WSC IE information.

A P2P IE information field includes information such as P2P Capability, P2P Device Info, Group Owner Intent, Configuration Timeout, Listen Channel, Extended Listen Timing, Intended P2P Interface Address, Channel List and Operating Channel attributes, and the WSC-IE information field includes information such as DEVICE PASSWORD ID, MANUFACTURER, MODEL NAME, MODEL NUMBER, SERIAL NUMBER, and DEVICE NAME.

For the P2P device 1, 210 and the P2P device 2, 212 their respective Group Owner Intent values, which is preset randomly, included in P2P IE information are compared, and a device with a larger intent value is determined as the Group Owner, while a device with a smaller intent value is determined as a Group Client.

The Group Owner Negotiation process is completed when one of the devices is determined to be a Group Owner and the other is determined to be the Group Client. In the exemplary case shown herein P2P device 1, 210 is deemed to be the Group Owner, while P2P device 2, 212 is deemed the Group Client. If Provisioning for exchanging Credentials is completed and the device set as Group Owner operates as a WSC registrar and the device set as Group Client operates as a WSC Enrollee, a group setting process for forming a Wi-Fi P2P group is completed.

If the group forming process is completed, the Group Owner moves to an operating channel and begins its role as the Group Owner. The Group Client accesses the Group Owner with the credentials it checked through Provisioning. Finally, the two devices are connected to the Wi-Fi P2P group.

The process of forming a Wi-Fi P2P group by devices having undergone Wi-Fi Direct certification has been schematically described so far. Based thereon, a process of forming a Wi-Fi P2P group by adjusting intent values depending on types of devices will be described.

Figure 3:
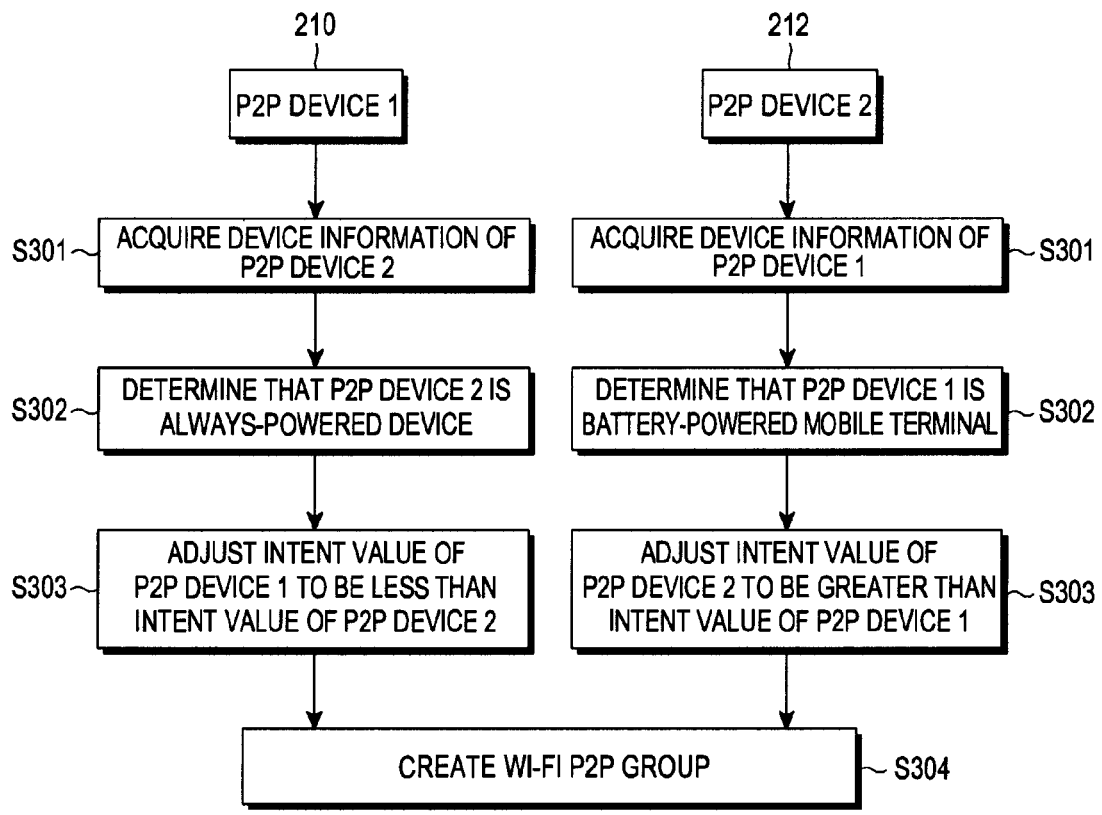
FIG. 3 illustrates a process of forming a Wi-Fi P2P group by adjusting intent values depending on types of devices according to an embodiment of the present invention.
Figure 4:
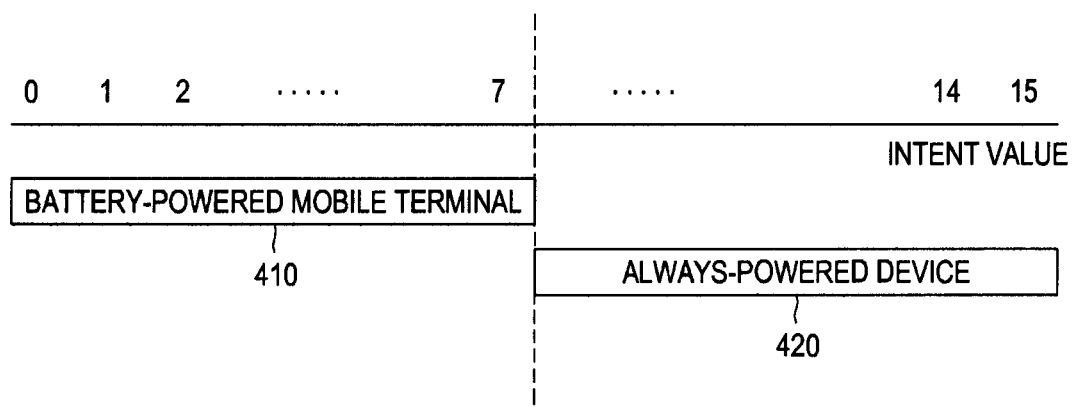
FIG. 4 illustrates a first exemplary process of forming a Wi-Fi P2P group by adjusting intent values depending on types of devices according to an embodiment of the present invention.
Figure 5:
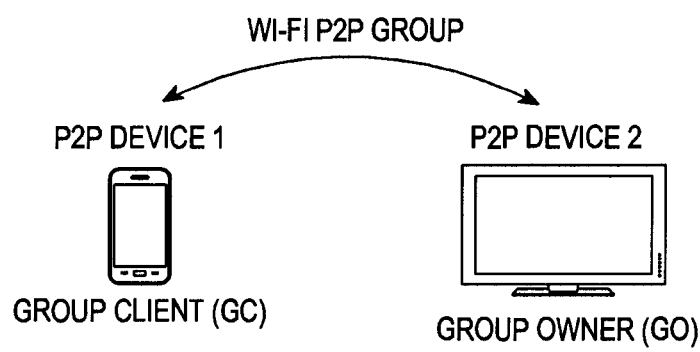
FIG. 5 illustrates a second exemplary process of forming a Wi-Fi P2P group by adjusting intent values depending on types of devices according to an embodiment of the present invention.

FIG. 3 illustrates a process of forming a Wi-Fi P2P group by adjusting intent values depending on types of devices according to an embodiment of the present invention. FIGS. 4 and 5 illustrate first and second exemplary processes of forming a Wi-Fi P2P group by adjusting intent values depending on types of devices according to other embodiment of the present invention.

In describing an embodiment of the present invention in conjunction with FIG. 3, it is assumed that as shown in FIG. 5, a P2P device 1, 210 in FIG. 3 is a mobile terminal powered by a battery and a P2P device 2, 212 is a device (e.g., TV) powered by constant power source (e.g., wall power, such as outlet power). Although a greater number of devices in addition to the two devices (the P2P device 1 and the P2P device 2) may participate in creation of a Wi-Fi P2P group, it is assumed that two P2P devices participate in creation of a Wi-Fi P2P group, for convenience purpose only. An intent value of the other party's device may be checked as it is included in a field (e.g., Group Owner Intent) of P2P IE described in conjunction with FIG. 2.

In steps S301 and S302, the P2P device 1, 210 and the P2P device 2, 212 each acquires device information of the other device and determines whether the other device is a battery-powered device or an always-powered device.

The Probe Request and Probe Response messages exchanged in the device discovery mode described in conjunction with FIG. 2 include WSC-IE information, and a field of WSC-IE includes device information.

Therefore, the P2P device 1, 210 may determine that the other device (P2P device 2, 212) is an always-powered device, based on the information included in the field of WSC-IE, such as DEVICE PASSWORD ID, MANUFACTURER, MODEL NAME, MODEL NUMBER, SERIAL NUMBER and DEVICE NAME, and the P2P device 2, 212 may determine that the other device (P2P device 1, 210) is a battery-powered device.

For example, if it is checked that Model Name of the P2P device 1, 210 is Galaxy S™ and Device Name thereof is portable device, the P2P device 2, 212 may determine that the P2P device 1, 210 is a mobile terminal. Also, if it is checked that Model Name of P2P device 2, 212 is Pavv™ and Device Name thereof is TV, the P2P device 1, 212 may determine that the P2P device 2, 212 is a device powered by a constant power source.

In step S303, the P2P device 1, 210 and the P2P device 2, 212 each adjusts its own intent value depending on a type of the other device.

For example, if device 1, 210 determines that the P2P device 2, 212 is an always-powered device, the P2P device 1, 210 adjusts its intent value to be lower than an intent value of the P2P device 2, 212. Similarly, if device 2, 212 determines that the P2P device 1, 210 is a battery-powered device, the P2P device 2, 210 adjusts its intent value to be higher than an intent value of the P2P device 1, 210.

In step S304 the WI-FI P2P group is then created with device 1, 210 and device 2, 212, wherein the device with the higher intent value is selected as the Group Owner.

Referring to FIG. 4, adjusting intent values will be described in more detail. In Wi-Fi Direct, intent values may have values of 0 to 15. In adjusting intent values depending on types of devices, an embodiment of the present invention limits settable intent values according to types of devices.

For example, in the conventional Wi-Fi Direct, both the battery-powered device and the always-powered device may have intent values of 0 to 15. Conventionally, therefore, the mobile terminal may operate as GO in the Wi-Fi P2P group when it has an intent value that is higher than the intent value of the always-powered device.

Taking this into account, in one embodiment of the present invention a maximum intent value of a mobile terminal is set to 7, and a minimum intent value of an always-powered device is set to 8. Therefore, in step S303, the P2P device 1, 210 may adjust its intent value to any one of the intent values in the range of 0 to 7 (i.e., a first range, 410), if it is determined that the P2P device 1, 210 is a mobile terminal, and the P2P device 2, 212 is an always-powered device. Similarly, the P2P device 2, 212 may adjust its intent value to an intent value in the range of 8 to 15 (i.e., a second range, 420), if it is determined that the P2P device 2, 212 is an always-powered device and the P2P device 1, 210 is a battery powered device.

For example, when P2P device 1, 210 is a battery-powered device, it may reduce its current intent value by some number of units (e.g., two) until the intent value is within the range of 0-7. Similarly, the P2P device 2, 212 may increase its intent value by increasing its current intent value by a number of units (e.g., 3 units) until the intent value is within the range of 8-15.

In step S304, the P2P device 1 and the P2P device 2 each performs the remaining operation related to Wi-Fi P2P group creation based on the adjusted intent values, as previously described. If the Group Owner Negotiation process described in conjunction with FIG. 2 is performed after the intent value of the P2P device 1, 210 is adjusted to be smaller than the intent value of the P2P device 2, 212, the P2P device 1 is set as GC and the P2P device 2 is set as the GO in creating a Wi-Fi P2P group.

In this manner, an embodiment of the present invention may prevent the battery-powered P2P device 1, 210 from being set as GO, thus extending a running time of the P2P device 1, 210 compared to when the P2P device 1, 210 is set as the GO.

For example, when a Wi-Fi P2P group is formed or created between a P2P device 1 (e.g., mobile terminal) and a P2P device 2 (e.g., TV powered by wall power) as shown in FIG. 5, the always-powered TV operates as the Group Owner based on the adjusted intent values.

Thus, if a battery of the P2P device 1, 210 is selected as the GO and becomes exhausted with the Wi-Fi P2P group created between the P2P device 1, 210 and the P2P device 2, 212, the Wi-Fi P2P group can no longer be maintained. Hence, in accordance with an embodiment of the present invention described in conjunction with FIG. 3 a running time of the Wi-Fi P2P group may be extended as the Group Owner is always selected as the device that is provided with a constant power supply.

Figure 6:
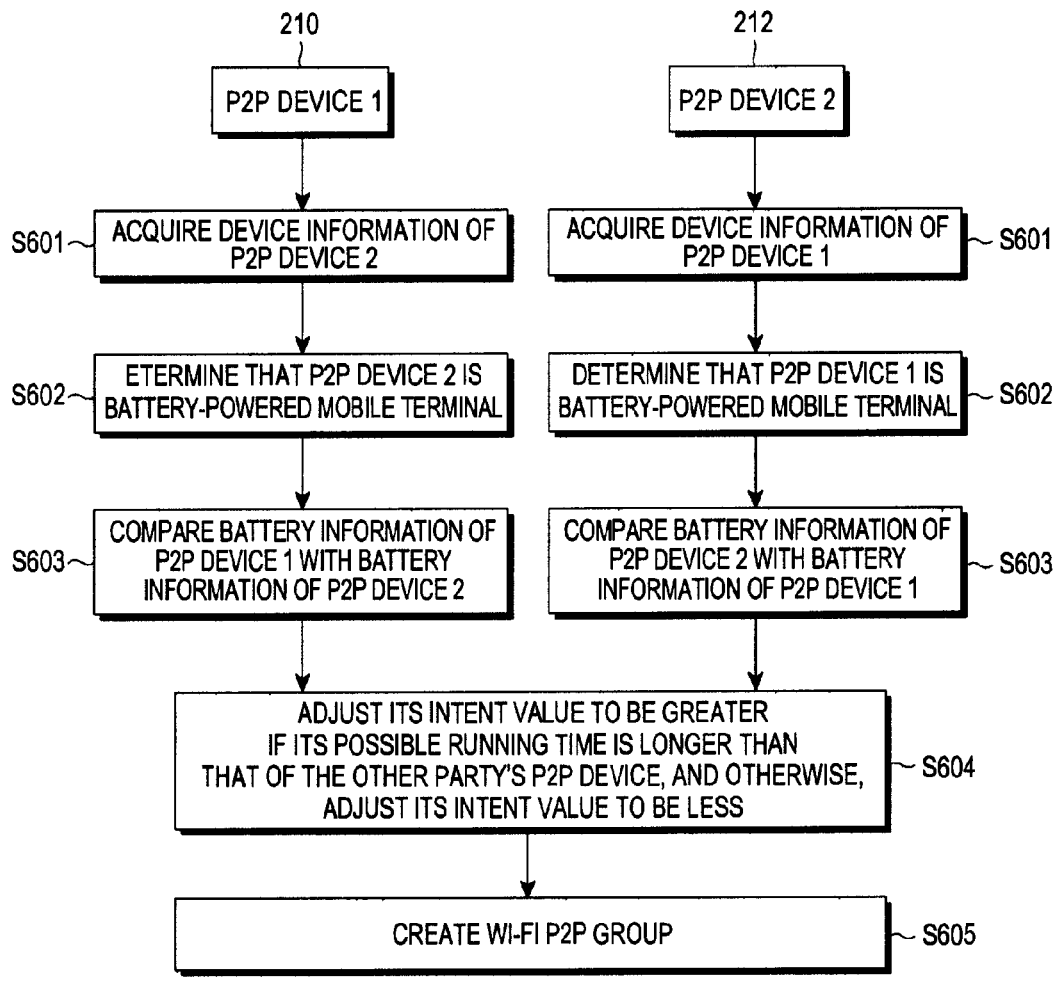
FIG. 6 illustrates a process of forming a Wi-Fi P2P group by adjusting intent values depending on battery information according to another embodiment of the present invention.
Figure 7:
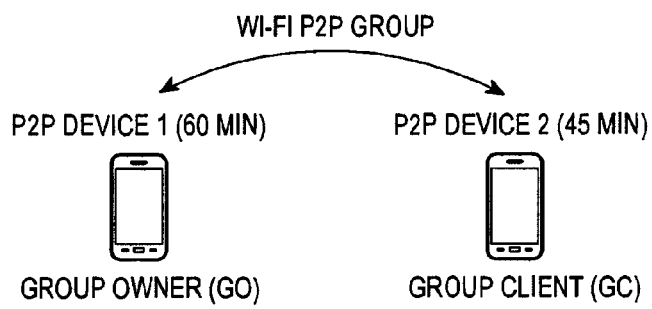
FIG. 7 illustrates a process of forming a Wi-Fi P2P group by adjusting intent values depending on battery information according to still another embodiment of the present invention.

FIG. 6 illustrates a process of forming a Wi-Fi P2P group by adjusting intent values depending on battery information according to another embodiment of the present invention. FIG. 7 illustrates a process of forming a Wi-Fi P2P group by adjusting intent values depending on battery information according to still another embodiment of the present invention.

Although an embodiment of the present invention described in conjunction with FIG. 3 is an embodiment in which the P2P device 2, 212 is set as the GO because the P2P device 1, 210 is a mobile terminal and the P2P device 2, 212 is an always-powered device, another embodiment of the present invention described in conjunction with FIG. 6 is an embodiment for forming a Wi-Fi P2P group by adjusting intent values when the P2P device 1, 210 and the P2P device 2, 212 are both mobile terminals.

In steps S601 and S602, P2P device 1, 210 and P2P device 2, 212, each acquire device information of the other device, and determine that the other device is also a battery-powered mobile terminal.

As described in conjunction with FIGS. 2 and 3, in steps S601 and S602, the P2P device 1, 210 and the P2P device 2, 212 each may determine that the other device is a mobile terminal, based on WSC-IE information included in a Probe Request or Probe Response message.

Thereafter, in steps S603 and S604, the P2P device 1, 210 and the P2P device 2, 212 each compares battery information of the other device with its own battery information, and adjusts its intent value based on the comparison results.

In another embodiment of the present invention, battery information includes information about the possible running time (or possible driving time) of the mobile terminal based on the battery level presently in use, and the battery information may be construed as part of the device information described in conjunction with FIG. 3. The battery information may be inserted into an idle field of P2P IE or WSC-IE included in the Probe Request or Probe Response messages described in conjunction with FIG. 2. In other words, each of the P2P devices (i.e., P2P device 1 and P2P device 2) according to this embodiment of the present invention described in conjunction with FIG. 6 may transmit its battery information to the other device by inserting the battery information into an idle field of P2P IE or WSC-IE when exchanging Probe Request and Probe Response messages in the device discovery mode.

In an exemplary example, device 1, 210 determines P2P device 2, 212 is a mobile terminal, the P2P device 1, 210 determines that its own possible running time is greater than a possible running time of the P2P device 2, through a comparison of battery information, and adjusts its intent value to be greater than an intent value of the P2P device 2.

Similarly, device 2, 212 determines that the P2P device 1, 210 is a mobile terminal, the P2P device 2 determines that its own possible running time is less than a possible running time of the P2P device 1, through a comparison of battery information, and adjusts its intent value to be less than an intent value of the P2P device 1, 210. As previously described, the intent value is to be included in a field (e.g., Group Owner Intent) of P2P IE described in conjunction with FIG. 2.

In one aspect of the invention, in this case described above, P2P device 1,210 may increase its intent value by a known number of units until the intent value is in the range of 8-15, for example. Similarly, P2P device 2, 212 may decrease its intent value by a second known number units unit the intent value is in the range of 0-7, for example. As would be appreciated, the values of the known number of units, referred to herein, are only exemplary values used to describe a process for increasing and decreasing intent values. However, it would be recognized other methods for increasing and decreasing intent values may be employed without altering the scope of the invention.

In step S605, the P2P device 1, 210 and the P2P device 2, 212 each performs the remaining operation related to Wi-Fi P2P group creation based on the adjusted intent values.

If the Group Owner Negotiation process described in conjunction with FIG. 2 is performed after an intent value of the P2P device 1, 210 is adjusted to be greater than an intent value of the P2P device 2 through steps S601 to S604, the P2P device 1 is set as GO and the P2P device 2 is set as GC, creating a Wi-Fi P2P group.

Referring to FIG. 7, as for the P2P device 1, 210 and the P2P device 2, 212 (both are mobile terminals), the P2P device 1, 210 whose possible running time is longer is set as the GO and the P2P device 2 whose possible running time is shorter is set as the GC, creating a Wi-Fi P2P group. Although, the example provided herein to illustrate the present invention describes P2P device 1, 210 as having a longer possible run time, it would be appreciated that the intent value of P2P device 2, 212 may be adjusted to be greater than P2P device 1, 210 when the possible running time of P2P device 2, 212 is greater than that of P2P device 1, 210.

In another embodiment of the present invention, when mobile terminals constitute a Wi-Fi Direct group (or Wi-Fi P2P group), a device with a longer possible running time of a battery is set as the GO, making it possible to extent the possible running time of the Wi-Fi P2P group. For example, if the P2P device 2, 212 with a possible running time of 45 minutes is set as the Group Owner, the possible running time of the Wi-Fi P2P group may be about 45 minutes. However, if the P2P device 1, 210 with a possible running time of 60 minutes is set as the Group Owner, the possible running time of the Wi-Fi P2P group may be about 60 minutes, extending the possible running time of the Wi-Fi P2P group by 15 minutes.

As is apparent from the foregoing description, according to exemplary embodiments of the present invention, when a battery-powered mobile terminal and an always-powered device form a Wi-Fi P2P group, the always-powered device is set as the Group Owner, making it possible to secure the maximum possible running time of the mobile terminal.

Similarly, when battery-powered mobile terminals form a Wi-Fi P2P group, a mobile terminal with a longer possible running time is set as the Group Owner, making it possible to secure the maximum possible running time of the Wi-Fi P2P group.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method performed by a first device for forming a Wi-Fi Peer-to-Peer (P2P) group with at least one second device using Wi-Fi Direct, the method comprising:
   receiving at least one device information of the at least one second device;
   adjusting an intent values of the first device based on a type of the at least one second device corresponding to the received device information of the at least one second device; and
   processing at least one operation related to formation of the Wi-Fi P2P group using the adjusted intent value.

2. The method of claim 1, wherein the device information is included in at least one of Peer to Peer Information-Element (P2P IE) and Wi-Fi Simple Configuration Information-Element (WSC-IE).

3. The method of claim 1, further comprising checking a type of the at least one second device, which comprises:
   determining whether the at least one second device is a battery-powered mobile terminal or an always-powered device.

4. The method of claim 3, wherein the adjusting an intent values of the first device comprises:
   reducing the intent value of the first device if the first device is a battery-powered device and the at least one second devices is an always-powered device.

5. The method of claim 3, wherein the adjusting the intent value of the first device comprises:
   increasing the intent value of the first device if the first device is an always-powered device and the at least one second device is a battery-powered device.

6. The method of claim 1, wherein adjusting the intent of the first device comprises:
   reducing the intent value to fall within a first range if the first device is a battery powered device and the at least one second device is determined to be an always-powered device, and increasing the intent value of the first device to fall within a second range higher than the first range if the first device is an always-powered device and the at least one second device is determined to be a battery-powered device.

7. The method of claim 1, wherein forming the Wi-Fi P2P group comprises:
   forming the Wi-Fi P2P group such that among devices of the group, a device with a greater intent value operates as a group owner and a device with a smaller intent value is set as a group client.

8. A method performed by a first Peer-to-Peer (P2P) device for forming a Wi-Fi P2P group with at least one second P2P device using Wi-Fi Direct, the method comprising:
   acquiring device information of the at least one second P2P device;
   checking a possible running time of the at least one second device based on the acquired device information;
   adjusting an intent value of the first P2P device based on a comparison of the possible running time of the at least one second P2P device with a possible running time of the first P2P device; and
   forming the Wi-Fi P2P group using the adjusted intent value.

9. The method of claim 8, wherein the device information is included in at least one of a Peer to Peer Information-Element (P2P IE) and a Wi-Fi Simple Configuration Information-Element (WSC-IE), and includes information about the P2P device's possible running time, including battery information of the P2P device.

10. The method of claim 9, wherein the first device and the at least one second device are each mobile terminals and adjusting an intent values comprises:
reducing the intent value of the first device when the possible running time of the first device is shorter than the possible running time of the at least one second device.

11. The method of claim 8, wherein the checking a possible running time of the at least one second P2P devices comprises:
determining whether the at least one second P2P devices is a battery-powered mobile terminal.

12. The method of claim 8, wherein the first P2P device and the at least one second P2P device are each mobile terminals, and adjusting an intent value comprises:
increasing the intent value of the first P2P device when the possible running time of the first P2P device is longer than the possible running time of the at least one second P2P device.

13. The method of claim 8, wherein the forming a Wi-Fi P2P group comprises:
selecting a P2P device with a greater intent value as a group owner and setting a P2P device with a lower intent value as a group client.

14. An apparatus for forming a Wi-Fi Peer-to-Peer (P2P) group using Wi-Fi Direct, comprising:
a Wi-Fi module providing a short-range wireless communication function based on an IEEE 802.11 standard; and
a controller:
acquiring device information of P2P devices to form the Wi-Fi P2P group by means of the Wi-Fi module,
checking a type of each of the P2P devices based on the acquired device information,
adjusting an intent value of a P2P device associated with the apparatus depending on the checked type of each of the other P2P devices, and
forming the Wi-Fi P2P group with the P2P device based on the adjusted intent value.

15. The apparatus of claim 14, wherein the device information is included in at least one of a Peer to Peer Information-Element (P2P IE) and a Wi-Fi Simple Configuration Information-Element (WSC-IE).

16. The apparatus of claim 14, wherein the controller determines whether the P2P devices are battery-powered or always-powered devices.

17. The apparatus of claim 16, wherein the controller adjusts the intent value of the P2P device associated with the apparatus to be less, if the P2P device is a battery-powered mobile terminal and at least one of the other P2P devices is an always-powered device.

18. The apparatus of claim 16, wherein the controller adjusts the intent value of the P2P device associated with the apparatus to be greater, if the P2P device associated with the apparatus is an always-powered device.

19. The apparatus of claim 16, wherein adjusting the intent value causes the intent value to be in one of: a first range and a second range.

20. The apparatus of claim 14, wherein the Wi-Fi P2P group is formed such that a P2P device with a greater intent value operates as a group owner and a P2P device with a less intent value is set as a group client.

21. An apparatus for forming a Wi-Fi Peer-to-Peer (P2P) group using Wi-Fi Direct, comprising:
a Wi-Fi module providing a short-range wireless communication function based on an IEEE 802.11 standard; and
a controller:
acquiring device information of other P2P devices corresponding to a connection target to form a Wi-Fi P2P group by means of the Wi-Fi module,
checking a possible running time of the other P2P devices based on the acquired device information,
adjusting an intent value of a P2P device associated with the apparatus depending on the checked possible running time of the other P2P devices, and
forming a Wi-Fi P2P group with the other P2P devices based on the adjusted intent value.

22. The apparatus of claim 21, wherein the device information is included in at least one of a Peer to Peer Information-Element (P2P IE) and a Wi-Fi Simple Configuration Information-Element (WSC-IE), and includes information about the P2P device's possible running time, including battery information of the P2P device.

23. The apparatus of claim 22, wherein the controller further:
compares a possible running time of the P2P device associated with the apparatus with a possible running time of the other P2P devices if the P2P device and the other P2P devices are mobile terminals; and
adjusts the intent value of the P2P device associated with the apparatus to be greater if the possible running time of the P2P device associated with the apparatus is longer than the possible running time of the other P2P devices.

24. The apparatus of claim 22, wherein the controller further:
compares a possible running time of the P2P device associated with the apparatus with a possible running time of the other P2P devices if the P2P device and the other P2P devices are mobile terminals; and
adjusts the intent value of the P2P device associated with the apparatus to be less if the possible running time of the P2P device associated with the apparatus is shorter than the possible running time of the other P2P device.

25. The apparatus of claim 21, wherein the controller determines whether the other P2P devices are battery-powered.

26. The apparatus of claim 21, wherein the Wi-Fi P2P group is formed such that a P2P device with a greater intent value operates as a group owner and a P2P device with a less intent value is set as a group client.

* * * * *

UNITED STATES PATENT AND TRADEMARK OFFICE
CERTIFICATE OF CORRECTION

Page 1 of 1

PATENT NO. : 9,078,087 B2
APPLICATION NO. : 13/567346
DATED : July 7, 2015
INVENTOR(S) : Su-Ha Yoon It is certified that error appears in the above-identified patent and that said Letters Patent is hereby corrected as shown below:

In the Claims

Column 12, Claim 1, Line 7 should read as follows:
--…an intent value of…--

Column 12, Claim 4, Lines 22-23 should read as follows:
--…intent value of the…--

Column 12, Claim 4, Lines 25-26 should read as follows:
--…second device is an…--

Column 13, Claim 10, Line 3 should read as follows:
--…an intent value comprises…--

Column 13, Claim 11, Lines 8-9 should read as follows:
--…second P2P device comprises…--

Column 13, Claim 11, Line 10 should read as follows:
--…second P2P device is…--

Signed and Sealed this
Twenty-seventh Day of October, 2015

Michelle K. Lee
*Director of the United States Patent and Trademark Office*